US008695062B2

(12) United States Patent
Speed et al.

(10) Patent No.: US 8,695,062 B2
(45) Date of Patent: Apr. 8, 2014

(54) AUTHENTICATION/AUTHORIZATION PROTOCOL FOR MEDIA PROCESSING COMPONENTS

(75) Inventors: Robin C. B. Speed, Winchester (GB); Frank D. Yerrace, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1021 days.

(21) Appl. No.: 12/358,828

(22) Filed: Jan. 23, 2009

(65) Prior Publication Data

US 2010/0191957 A1    Jul. 29, 2010

(51) Int. Cl.
| | |
|---|---|
| *G06F 7/04* | (2006.01) |
| *G06F 17/30* | (2006.01) |
| *G06F 15/16* | (2006.01) |
| *H04L 29/06* | (2006.01) |
| *G06F 12/00* | (2006.01) |
| *G06F 12/14* | (2006.01) |
| *G06F 13/00* | (2006.01) |
| *G11C 7/00* | (2006.01) |

(52) U.S. Cl.
USPC ............... 726/2; 726/3; 726/21; 713/152

(58) Field of Classification Search
USPC .................. 713/152; 726/2, 3, 21
See application file for complete search history.

(56) References Cited

U.S. PATENT DOCUMENTS

| | | | |
|---|---|---|---|
| 6,615,350 B1 | 9/2003 | Schell et al. | |
| 7,155,415 B2 | 12/2006 | Russell et al. | |
| 7,308,717 B2 | 12/2007 | Koved et al. | |
| 2006/0021057 A1 | 1/2006 | Risan et al. | |
| 2006/0195909 A1 | 8/2006 | Boswell et al. | |
| 2007/0083766 A1* | 4/2007 | Farnham et al. | ............... 713/176 |
| 2007/0204078 A1 | 8/2007 | Boccon-Gibod et al. | |
| 2008/0097775 A1 | 4/2008 | Kim | |
| 2009/0151006 A1* | 6/2009 | Saeki et al. | .................... 726/28 |
| 2009/0220216 A1* | 9/2009 | Marsh et al. | ................. 386/124 |
| 2009/0304115 A1* | 12/2009 | Pittaway et al. | ............. 375/340 |
| 2010/0088236 A1* | 4/2010 | Karabulut et al. | ............. 705/59 |

OTHER PUBLICATIONS

"Experiment Report on Attack Microsoft Media DRM", Retrieved at <<http://icsd.i2r.a-star.edu.sg/staff/yongdong/workMSdrm.pdf>>, pp. 3.

* cited by examiner

*Primary Examiner* — Kambiz Zand
*Assistant Examiner* — Benjamin Kaplan
(74) *Attorney, Agent, or Firm* — Carole Boelitz; Micky Minhas (57) ABSTRACT

A computer-implemented authentication protocol is used to subvert man-in-the-middle-type attacks on communications between software components that are permitted to interoperate within a processing environment, such as a media processing environment, pursuant to one or more licenses. In one exemplary scenario, a particular application transmits to a particular media processing component ("MPC"), among other things, a cryptographically protected message including a reference to a process in which the application is running and/or a GUID that the application used to invoke the MPC. If the received process and/or GUID are verified, it is possible for in-the-clear communication to occur between the application and the MPC without man-in-the-middle subversion.

17 Claims, 5 Drawing Sheets

AUTHENTICATION/AUTHORIZATION PROTOCOL FOR MEDIA PROCESSING COMPONENTS

BACKGROUND

Many types of cryptographic solutions are used to provide security for communications between entities or devices. Authentication techniques are often used when it cannot be assumed that a particular communication channel is secure. An authentication technique requests one entity or device to convince another entity or device that it has knowledge of certain information, without the information being transmitted in the clear and/or being tampered with over the channel of communication between the two entities and/or devices.

Some authentication protocols are vulnerable to "man-in-the-middle" attacks, where an attacker inserts itself between two communicating entities or devices, to make either or both entities or devices believe they are communicating directly with each other. An example of an authentication protocol is a challenge-response authentication protocol, although many other types of known authentication protocols may also be vulnerable to man-in-the-middle attacks. In accordance with a challenge-response authentication protocol, a first entity or device presents a question (the challenge) to a second entity or device, and the second entity or device provides a verifiable answer (the response) to the question. A challenge-response authentication protocol may involve one-way or two-way authentication.

Authentication protocols are utilized in a variety of situations, including digital licensing. One exemplary use of a digital license is to protect an entity's intellectual property rights covering a particular software program by providing a mechanism for another software program to produce a valid digital license (or other verifiable information) prior to permitting the other software program to access services or functions provided by the particular software program. In the media processing context, for example, many entities have enforceable intellectual property rights covering processing components such as encoders and/or decoders ("codecs"), which perform various functions related to transformation of input media content in accordance with various algorithms and techniques to produce output media content. Such intellectual property rights are protected via digital licenses that are selectively issued to certain software applications and/or media processing components operating in certain media processing environments.

It is desirable to ensure that any authentication protocol used to establish the authenticity of software programs covered by one or more intellectual property rights and/or digital licenses has reduced vulnerability to man-in-the-middle attacks.

SUMMARY

A computer-implemented authentication/authorization protocol for authorizing use of a particular processing component, such as a media processing component, in connection with a particular processing environment, such as a media processing environment, is described herein. The protocol may be considered to be within the challenge-response family of protocols, although the terms challenge and response are used for purposes of illustration and not limitation, as various messages exchanged in accordance with the protocol may be considered to be either challenges, responses, or both, and the various messages exchanged herein may also be used in connection with other types of authentication protocols.

A processing environment such as an electronic device and/or an operating system thereof is configured to execute a number of software programs within a number of processes. Generally, a process is a particular instance of an execution of a set of computer-executable instructions, and is defined by the particular operating system on which it runs (Windows® operating system processes, Unix operating system processes, etc.) Each instance of a process is uniquely identified by the operating system. A particular software program or portion thereof may have an associated unique identifier, referred to for discussion purposes as a globally unique identifier ("GUID") (for example, a CLSID key), which may be persistent or temporary. For example, a particular GUID may be created at the time of authoring, or at the time of instantiation of a particular software program by an operating system, or assigned at another time. Examples of software programs include but are not limited to software applications configured to present, create, receive, transmit, transform and/or store media content such as audio, video, graphics, images, and combinations thereof, and media processing components that are accessed by and configured to perform certain services or functions for such software applications. One or more licenses permit, among other things, particular software applications (referred to herein as "licensed applications") to access services or functions provided by particular media processing components (referred to herein as "licensed media processing components"), or vice-versa. Using the protocol described herein, attempts by software programs provided by man-in-the-middle attackers (referred to herein as an "unlicensed media processing components" or "unlicensed applications") to intercept legitimate communications and to unlock licensed software programs for unlicensed uses can be thwarted.

In accordance with the protocol, a particular software application, which is running in a certain process, transmits a request to a particular processing component, which is also running in a certain process, to perform services or functions, such as some aspect(s) of the transformation of input media content to produce output media content for use by the particular software application. Based on the request, the processing component transmits a cryptographically secure authentication message to the software application. The authentication message may include information including but not limited to a nonce and/or a certificate from a trusted authority.

Based on the authentication message transmitted by the processing component, the software application transmits a cryptographically secure authentication message to the processing component. The authentication message transmitted by the software application includes, among other information (such as the nonce and/or a certificate from a trusted authority), a verifiable identifier associated with the software application or the processing component or both.

In a first exemplary implementation, the verifiable identifier is a "verifiable process identifier," which is a reference to the process in which the software application is running. It is ascertained whether the process is the same as the process in which the media processing component is running. In one scenario, the media processing component makes one or more API calls, such as a call to the operating system's GetCurrentProcessId( ) API, to verify that the processes are the same Generally, the processes are expected to be the same. In this manner, it is confirmed that the software application is licensed to access the processing component, that is, that the software application is authentic and not an unlicensed, man-in-the-middle application. When the processes are not the same, authenticity is still possible (for example, a processing component may be running in connection with another licensed application on a different process). The license or another source may be consulted to ascertain the identity of approved processes, and approved processes may also be determined programmatically at runtime through operating system calls.

In a second exemplary implementation, the verifiable identifier is a GUID associated with the processing component, for example, a class ID or a device path that the software application used to invoke the media processing component. It is ascertained whether the GUID is the same as the GUID with which the processing component is registered. In one scenario, the processing component makes one or more API calls to verify that the GUIDs are the same. In this manner, it is possible to thwart attempts by an unlicensed processing component acting as a man-in-the-middle to receive and process content. The license or another source may also be consulted to ascertain the identity of valid GUIDs.

Once the processing component and/or software application have been authenticated via aspects of the protocol described herein, it is possible for more direct communication, for example unprotected communication, to occur between the software application and the processing component without man-in-the-middle subversion. For example, the software application may directly call the API of the processing component, passing encoded data and retrieving decoded data, or vice-versa.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this document.

DETAILED DESCRIPTION

The computer-implemented authentication/authorization protocol and processing environment described herein are used to subvert man-in-the-middle-type attacks on electronic communications between particular software components, such as media processing components ("MPCs"), and particular software applications that are permitted to access services or functions provided by such software components pursuant to one or more licenses.

Figure 1:
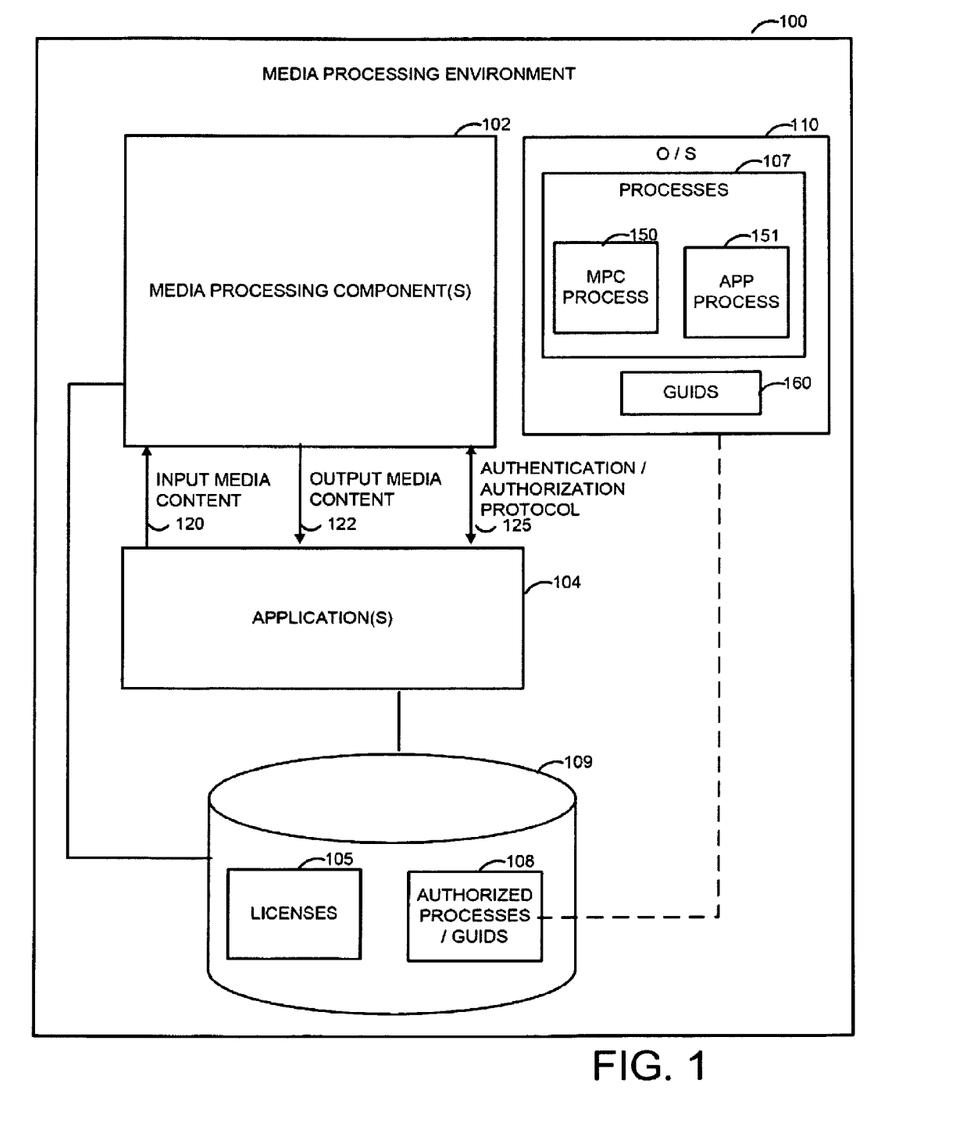
FIG. 1 is a simplified functional block diagram of certain aspects of an exemplary media processing environment.

Turning to the drawings, where like numerals designate like components, FIG. 1 is a simplified functional block diagram of certain aspects of a processing environment 100, which for exemplary purposes is a media processing environment. Media processing environment 100 may be, or may include, but is not limited to: an electronic device or a portion thereof, such as a server or a consumer electronic device (for example, a personal computer, a phone, a video game system, a media player device such as a video player or audio player, a personal digital assistant, a set-top box device, a digital recording device, or an in-vehicle device); a software program or system such as an application or an operating system; or any other hardware, software, firmware, or combination thereof configured for media processing.

Media processing environment 100 is configured to execute (or "run") a number of software programs within a number of processes 107 (as shown, associated with an operating system ("O/S") 110), including but not limited to applications 104 and MPCs 102. O/S 110 is any known or later developed framework or system for managing resources and coordinating activities of media processing environment 100. Generally, a process is a particular identifiable instance of an execution of a set of computer-executable instructions, and is defined by the particular operating system on which it runs. A particular software program or portion thereof may have an associated unique identifier, referred to for discussion purposes as a globally unique identifier ("GUID") 160 (for example, a CLSID key), which may be persistent or temporary. For example, a particular GUID may be created at the time of authoring, or at the time of instantiation of a particular software program by an operating system, or assigned at another time.

As shown, a particular MPC 102 runs within a particular MPC process 150, and a particular application 104 runs within a particular application process 151. Generally, a particular MPC and a particular application that are authorized for interoperation via one or more licenses 105 (licenses are discussed further below) run within the same process 107 (that is, the MPC process and the application process are the same.) Also, a class ID or device path used by a particular application to invoke a particular MPC is generally the same as the GUID with which a legitimate MPC is registered. A device path is a reference to a physical device, such as a physical address unique to the device or another unique reference to the physical device. A license or another source may also be consulted to ascertain the identity of valid GUIDs. It is possible, however, for MPCs 102 and applications 104 that are authorized for interoperation to run within different processes 107 (that is, for the MPC process and the application process to be different), and/or for the GUID with which an MPC is registered to be different from the class ID or device path used by a particular application to invoke the MPC. In these instances, references to authorized processes/GUIDs 108 may be provided to aid in authenticating such interoperation at runtime (use of authorized processes 108 and an exemplary authentication/authorization protocol 125 are discussed further below, in connection with FIG. 4).

Applications 104 represent any known or later developed computer-executable instructions configured to present, create, receive, transmit, transform and/or store media content such as audio, video, graphics, images, and combinations thereof, in any known or later developed file or distribution format.

Processing components 102 (referred to herein as MPCs) represent any known or later developed hardware, software, or firmware components that include at least in part certain computer-executable instructions accessible (when permitted via one or more licenses 105, as discussed further below) by applications 104 to perform certain services or functions for such applications. Generally, services or functions performed by MPCs 102 relate to some aspect(s) of the transformation of input media content 120 to produce output media content 122, such as encoding, decoding, multiplexing, demulitplexing, and the like. It will be appreciated, however, that aspects of the authentication/authorization protocol discussed herein may be applied to any type of application 104 that accesses services or functions performed by a separate software component within a particular processing environment.

Licenses 105 represent items (electronic or physical) stored in predetermined locations (internal or external to media processing environment 100) that are effective to grant, under the intellectual property rights of one or more entities, permission for (or limits on/prohibition of) specific activities related to interoperation of particular applications 104 (referred to herein as "licensed applications") and particular MPCs 102 (referred to herein as "licensed MPCs.") An exemplary license 105 is a digital license. Generally, permissions granted via a license 105 are effected via aspects of an authentication protocol, which provides a mechanism for a first software program (such as a licensed application) and a second software program (such as a licensed MPC) to exchange verifiable information. Upon verification of the exchanged information, interoperation of the software programs is authorized. One protocol that is sometimes used in connection with digital licensing is discussed in connection with FIG. 2, and an improved authentication/authorization protocol 125 that is proposed for use herein (which may be used in connection with digital licensing or in connection with other authorization schemes) is discussed in connection with FIG. 4. As shown in FIG. 1, an information repository 109, which may be implemented by one or more computer-readable media (computer-readable media 504 are discussed in connection with FIG. 5), stores licenses or references thereto (which in one possible implementation are digital licenses) 105 and a reference to authorized processes/GUIDs 108. Authorized processes/GUIDs 108 may be predetermined or derived by the MPC at runtime. It will be appreciated that any known or later developed digital rights management scheme or system may be used to create and/or distribute digital licenses, when used, and such schemes are not discussed in detail herein.

Figure 2:
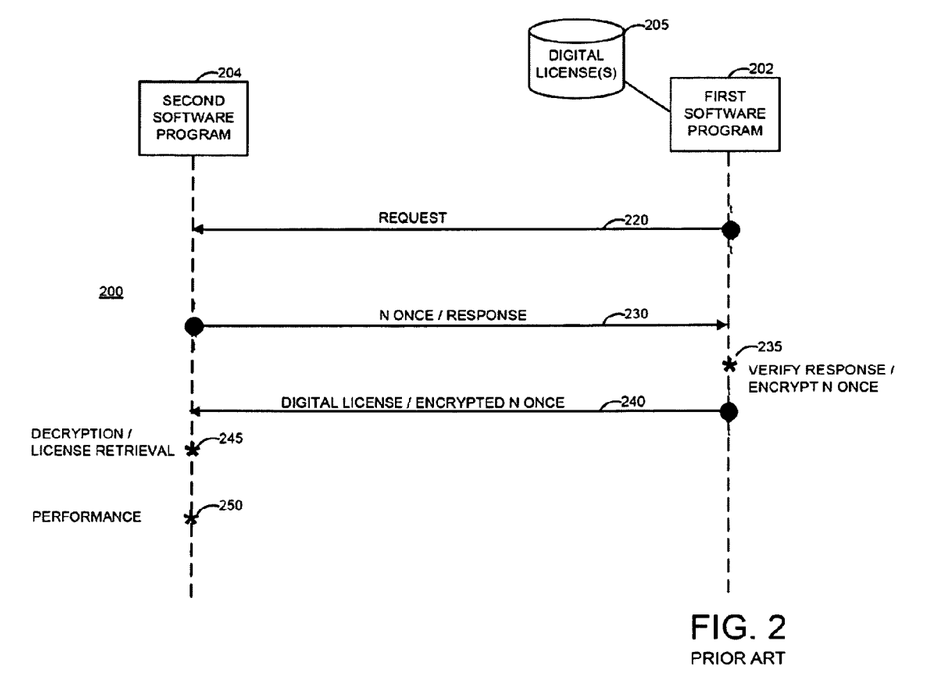
FIG. 2 is a message flow diagram illustrating a challenge-response authentication protocol that is sometimes utilized in connection with digital licensing.

With continuing reference to FIG. 1, FIG. 2 is a message flow diagram 200 illustrating aspects of a challenge-response authentication protocol (one-way or mutual) that is sometimes utilized in connection with digital licensing. As shown, first software program 202 has access to a digital license 205 (or like information, such as a certificate issued by a trusted authority) that may be transmitted to second software program 204 upon authentication of second software program 204 and used to authorize interoperation of the software programs. Initially, first software program 202 may transmit a request 220 to second software program 204. In response, second software program 204 issues randomly or pseudo-randomly generated information (referred to as a "nonce") to ensure that each challenge-response sequence is unique, and cryptographically protects (using a hash algorithm, for example) the nonce within response 230, which it transmits to first software program 202. Response 230 may also include other cryptographically protected information such as challenge value 220.

As indicated at asterisk 235, first software program 202 prepares its own response message 240, which is used to transmit digital license 205 (or a reference to digital license 205 that can be used to retrieve the digital license from a third party), or other desired information used to authorize and/or facilitate interoperation of the software programs, to second software program 204. First software program 202 cryptographically protects (using a hash algorithm using the private key of the license assigned to the first software program, for example) the nonce within message 240, and may optionally include other cryptographically protected information within message 240, such as the challenge value 220 (in the case of 2-way authentication). As indicated at asterisk 245, upon receipt of message 240, second software program 204 verifies that message 240 was received as expected, and retrieves digital license 205 therefrom. If desired, action may be taken to verify digital license 205, such as, among other things, verification that a digital certificate used to provide a digital signature for the license was issued by a trusted, valid authority. After verification of digital license 205, if any, second software program 204 is unlocked for use by first software program 202, and performance of applicable services and/or functions may occur, as indicated at asterisk 250.

Figure 3:
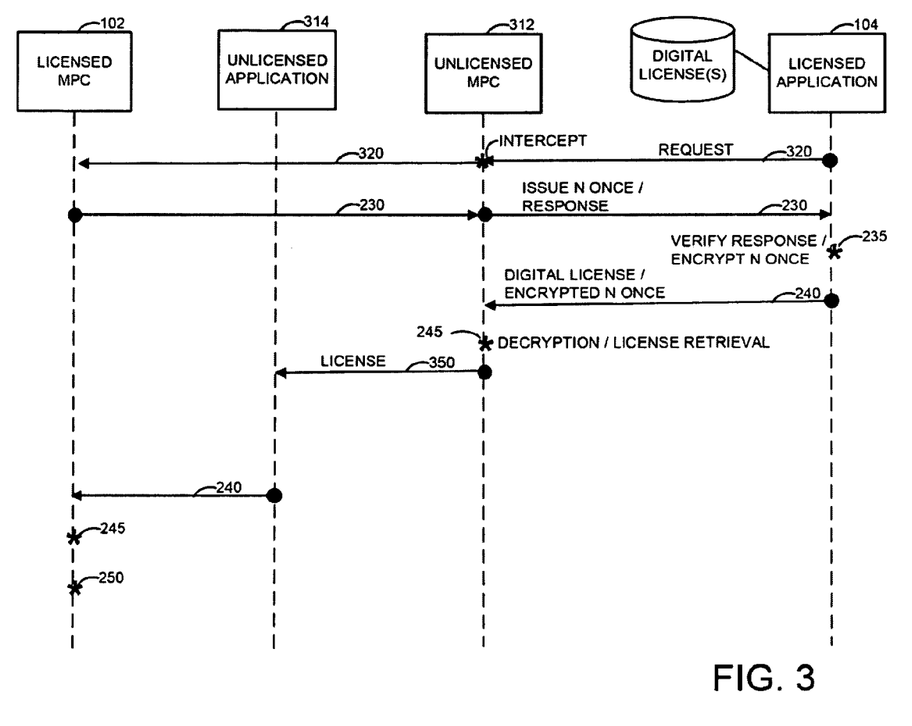
FIG. 3 is a message flow diagram illustrating the vulnerability of the challenge-response authentication protocol shown in FIG. 2 to an exemplary man-in-the-middle attack.

With continuing reference to FIGS. 1 and 2, FIG. 3 is a message flow diagram illustrating the vulnerability of the challenge-response authentication protocol shown in FIG. 2 to an exemplary man-in-the-middle attack, when the authentication protocol is used in the context of a digital license configured to permit specific activities related to interoperation of licensed applications 104 and licensed MPCs 102 within media processing environment 100. It can be seen, using a similar method but without the need for unlicensed application 314, that an unlicensed MPC 312, which is an MPC provided by a man-in-the-middle attacker, intercepts request 320 (which may be a challenge value or simply a request to commence authentication of licensed MPC 104) from licensed application 104. The message flow continues as described in connection with FIG. 2 (see above description of items 230, 235, 240), and the digital license is retrieved at asterisk 245. Digital license 105 (or a reference thereto) is then transmitted via message 350 to an unlicensed application 314, which is also provided by the man-in-the-middle attacker. Unlicensed application 314 proceeds to unlock licensed MPC 102 for its own, unlicensed use, pursuant to the aforementioned method flow of the authentication protocol described in connection with FIG. 2. It can also be seen that unlicensed MPC 312 may get to be trusted by licensed application 104 by replaying calls to and from licensed application 104 back to licensed MPC 102. Once trust is established, unlicensed MPC 312 may handle further calls from licensed application 104, rather than passing such calls to licensed MPC 102. Accordingly, it is desirable to ensure that an authentication protocol used in connection with techniques for permitting interoperation of software programs within media processing environments such as media processing environment 100 has reduced vulnerability to such man-in-the-middle attacks.

With continuing reference to FIGS. 1-3, FIG. 4 is a message flow diagram illustrating aspects of authentication/authorization protocol 125. It is assumed that one or more licenses 105 are configured to permit specific activities related to interoperation of a particular licensed application 104, which is running in application process 151, and a particular licensed MPC 102 having MPC GUID 160 (for example, a CLSID key), which is running in MPC process 150, within media processing environment 100. The message flows illustrated in FIG. 4 may be implemented as methods, using computer-executable instructions executed by one or more general, multi-purpose, or single-purpose processors (exemplary computer-executable instructions 506 and processor 502 are discussed further below, in connection with FIG. 5). Unless specifically stated, the methods described herein are not constrained to a particular order or sequence. In addition, some of the described method or elements thereof can occur or be performed concurrently. It will be understood that all of the steps shown need not occur in performance of the functions described herein.

Figure 4:
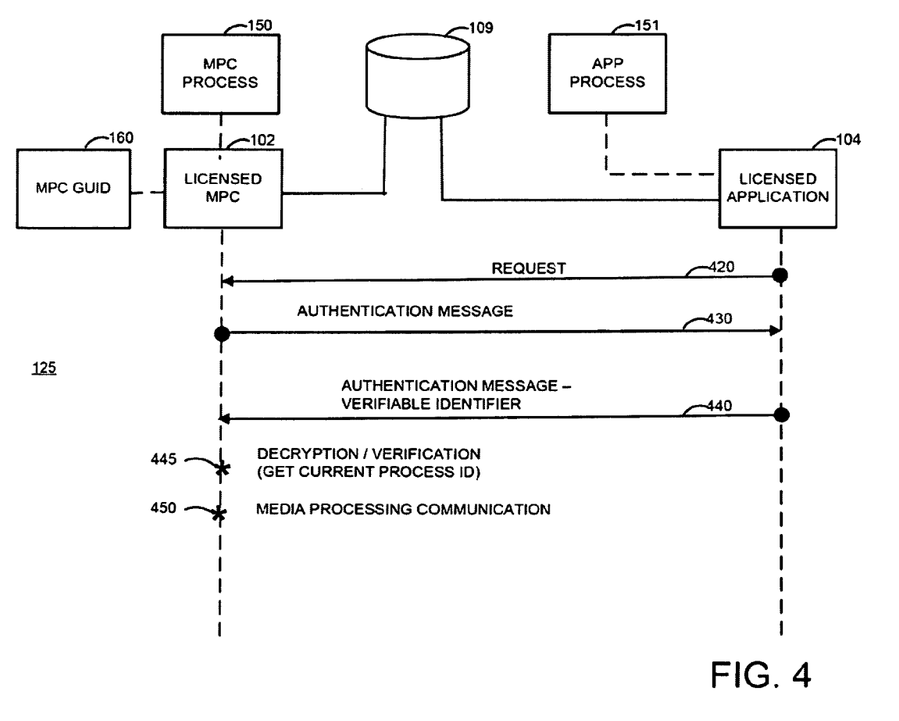
FIG. 4 is a message flow diagram illustrating an authentication/authorization protocol for use with the exemplary media processing environment shown in FIG. 1, which has reduced vulnerability to man-in-the middle attacks.

As shown, application 104 transmits a request 420 to MPC 102 (which may be a challenge value and/or a request to perform some aspect(s) of the transformation of input media content 120 to produce output media content 122.) Based on the request, MPC 102 transmits authentication message 430 (which may be deemed to be a challenge or a response) to application 104. Authentication message 430 may be cryptographically secure, and may include information such as a nonce and/or a certificate issued by a trusted authority, or other desired information.

Based on authentication message 430, application 104 transmits a cryptographically secure authentication message 440 to MPC 102. Authentication message 440 includes, among other information (such as the nonce and/or a certificate from a trusted authority), a verifiable identifier associated with application 104 or MPC 102 or both.

In a first exemplary implementation, the verifiable identifier is a "verifiable process identifier," which is a reference to application process 151 in which the application 104 is running. In implementation, the verifiable process identifier may be an indirect reference to application process 151, such as an address, a vector, a pointer, a URL, a variable, or another known or later developed element to achieve such indirection.

As indicated at asterisk 445, MPC 102 receives and verifies the authenticity of application process 151 received via authentication message 440. In one scenario, MPC 102 makes one or more API calls, such as a call to the operating system's GetCurrentProcessId( ) API. Generally, MPC 102 expects application process 151 and MPC process 150 to be the same, which indicates that application 104 is licensed to access MPC 102, and is not a man-in-the-middle attacker. When the processes are not the same, authenticity is still possible (for example, MPC 102 may be running in connection with another licensed application on a different process). License(s) or another source, such as a reference to a list or other arrangement of authorized processes, may be consulted to ascertain the identity of approved processes. The identity of approved processes may also be determined programmatically at runtime through operating system calls.

In a second exemplary implementation, the verifiable identifier is a GUID 160 associated with MPC 102, for example, a class ID or a device path that application 104 used to invoke the MPC 102. As a practical matter, only one MPC can have a particular class ID or device path (barring other types of code tampering). In implementation, the GUID may be an indirect reference, such as an address, a vector, a pointer, a URL, a variable, or another known or later developed element to achieve such indirection. As indicated at asterisk 445, MPC 102 receives and verifies the authenticity of GUID 160 received via authentication message 440. Generally, the received GUID is expected to be the same GUID with which MPC 102 is registered, which indicates that the application did invoke licensed MPC 102, rather than a man-in-the-middle MPC. If desired, MPC 102 can also add extra validation by ensuring that the system registry containing its registration has not been tampered with. License(s) 105 or another source, such as a reference to a list or other arrangement of authorized GUIDs, may be consulted to ascertain the identity of valid GUIDs.

Once MPC 102 and/or application 104 have been authenticated via aspects of the protocol described herein, it is possible for more direct communication, for example unprotected communication, to occur between application 104 and the MPC 102, without man-in-the-middle subversion. For example, as indicated at asterisk 450, application 104 may direct media processing activity by directly calling the API of MPC 102, passing encoded data thereto and retrieving decoded data therefrom, or vice-versa.

In this manner, protocol 125 of low cost and complexity may be used to subvert man-in-the-middle-type attacks on electronic communications between software components that are permitted to interoperate within a media processing environment pursuant to one or more licenses, and once desired authentication has been accomplished via protocol 125, it is not necessary to continue to send all further communications using an expensive security mechanism such as signing and/or encryption.

With continued reference to FIGS. 1-4, FIG. 5 is a simplified block diagram of an exemplary operating environment 500 in which aspects of the media processing environment shown in FIG. 1 and/or the authentication protocol shown in FIG. 4 may be implemented or used. Operating environment 500 is only one example of a suitable operating environment and is not intended to suggest any limitation as to the scope of use or functionality of the system(s) and methods described herein. For example, operating environment 500 may be a type of computer, such as a personal computer, a workstation, a server, a portable device, a laptop, a tablet, or any other type of electronic device, such as a mobile phone, a personal digital assistant, a media player device; a set-top box device; a digital recording device; an in-vehicle device, or any hardware, software, or firmware aspect of the foregoing. Operating environment 500 may also be a distributed computing network or a service, for example.

Figure 5:
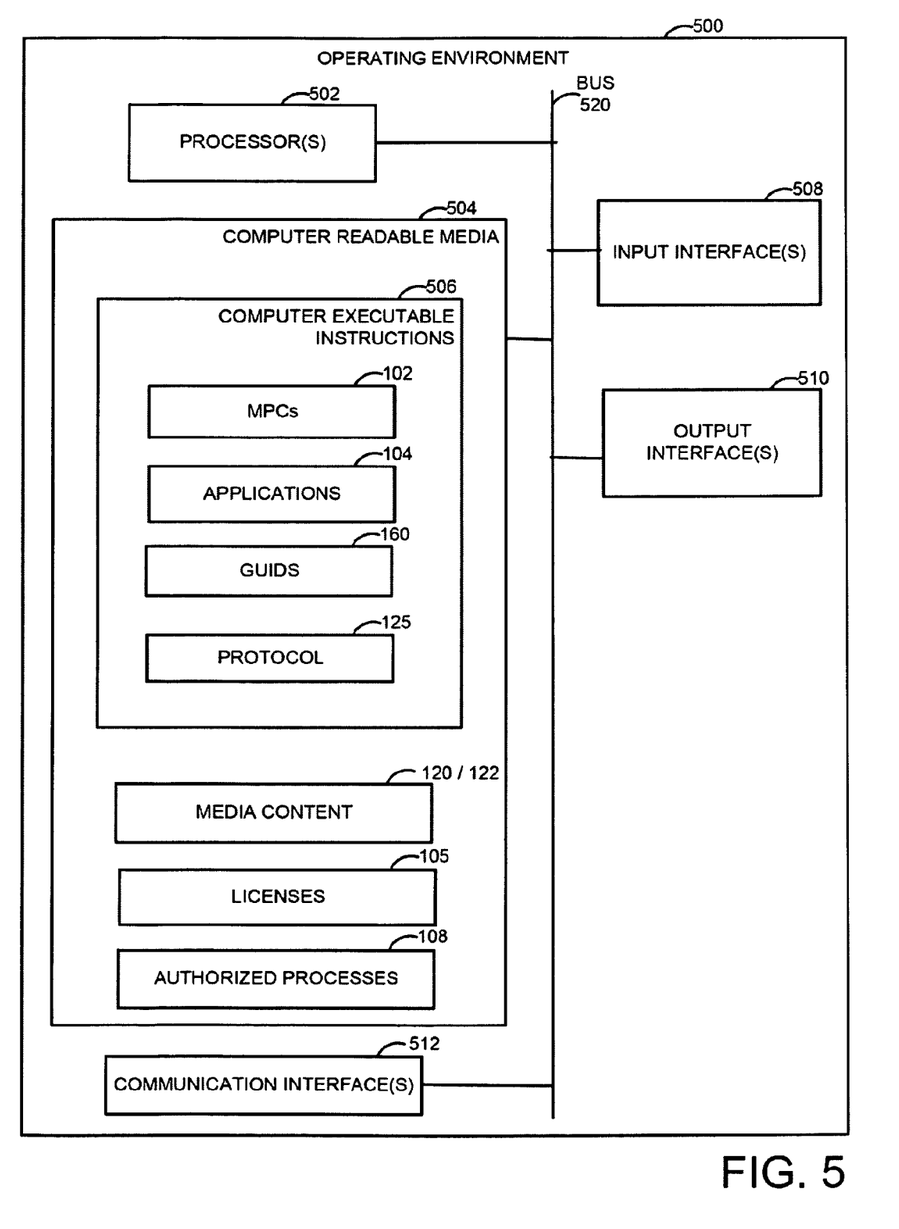
FIG. 5 is a simplified functional block diagram of an exemplary operating environment in which aspects of the media processing environment shown in FIG. 1 and/or the authentication/authorization protocol shown in FIG. 4 may be implemented or used.

One or more communication media 520 may be used to carry data, addresses, messages, control signals, and other information within, to, or from operating environment 500 and/or elements thereof A processor 502 is responsive to computer-readable media 504 and to computer-executable instructions 506. Processor 502, which may be a real or a virtual processor, controls functions of an electronic device by executing computer-executable instructions. Processor 502 may execute instructions at the assembly, compiled, or machine-level to perform a particular process. Such instructions may be created using source code or any other known computer program design tool.

Computer-readable media 504 represent any number and combination of local or remote devices, in any form, now known or later developed, capable of recording, storing, or transmitting computer-readable data, such as the instructions executable by processor 502. In particular, computer-readable media 504 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 504 may also include transmission media and data associated therewith. Examples of transmission media/data include, but are not limited to, data embodied in any form of wireline or wireless transmission, such as packetized or non-packetized data carried by a modulated carrier signal.

Computer programs 506 represent any signal processing methods or stored instructions that electronically control predetermined operations on data. In general, computer-executable instructions 506 are computer programs implemented as software components according to well-known practices for component-based software development, and encoded in computer-readable media (such as computer-readable media 504). Computer programs may be combined or distributed in various ways.

Functions/components described in the context of media processing environment 100 are not limited to implementation by any specific embodiments of computer programs. Rather, functions are processes that convey or transform data, and may generally be implemented by, or executed in, hardware, software, firmware, or any combination thereof, located at, or accessed by, any combination of functional elements of media processing environment 100.

Input interface(s) 508 provide input to operating environment 500. Input may be collected using any type of now known or later-developed interface, such as a user interface. Examples of input interfaces include but are not limited to remote controls, displays, mice, pens, styluses, trackballs, keyboards, microphones, scanning devices, and all types of devices that are used input data.

Output interface(s) 510 provide output from operating environment 500. Examples of output interface(s) 510 include but are not limited to displays, printers, speakers, drives, and the like.

Communication interface(s) 512 are available to enhance the ability of operating environment 500 to receive information from, or to transmit information to, another entity via a communication medium such as a channel signal, a data signal, or a computer-readable medium. External communication interface(s) 512 may be, or may include, elements such as cable modems, data terminal equipment, media players, data storage devices, personal digital assistants, or any other device or component/combination thereof, along with associated network support devices and/or software or interfaces.

Various aspects of a media processing environment and an authentication protocol therefore have been described. It will be understood, however, that all of the described aspects of the media processing environment and/or protocol need not be used, nor must the aspects, when used, be present concurrently. Functions/components described herein as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer implemented method for authorizing use of a media processing component in connection with a media processing environment, the media processing environment having a plurality of processes and configured to run a plurality of software applications, each software application configured to run in a particular application process of the plurality of processes, the media processing component comprising at least in part a set of computer-executable instructions which, when executed in a particular component process of the plurality of processes, transforms input media content to produce output media content, predetermined authentication data effective to permit a particular software application running in a particular application process to cause the computer-executable instructions to be executed, the method comprising:

receiving a request for execution of the set of computer-executable instructions to transform particular input media content to produce particular output media content for use by a particular software application;

transmitting a first authentication message to the particular software application, the authentication message including a nonce and/or certificate;

based on the first authentication message, receiving a cryptographically secure second authentication message from the particular software application, the second authentication message including the transmitted nonce and/or certificate, and also at least one item of predetermined authentication data comprising (i) a reference to an application process in which the particular software application is running or (ii) a reference to a globally unique identifier that the particular software application used to invoke the media processing component or (iii) both, wherein when the at least one item of predetermined authentication data comprises a reference to an application process in which the particular software application is running or an application process approved by the particular software application, the step of validating comprises determining whether the referred-to application process is the same as the particular application process in which the media processing component is running, by making one or more API calls to verify the referred-to-application process is the same as the particular application process are the same, and wherein when the at least one item of predetermined authentication data comprises a reference to a globally unique identifier that the particular software application used to invoke the media processing component, the step of validating comprises determining whether the referred-to globally unique identifier is the same as a globally unique identifier with which the media processing component is registered, by making one or more API calls to verify the referred-to globally unique identifier and the globally unique identifier with which the media processing component is registered are the same, validating that the at least one item of predetermined authentication data is effective to permit the particular software application to cause the computer-executable instructions to be executed; and upon validation, executing the set of computer-executable instructions to transform the particular input media content to produce the particular output media content for use by the particular software application.

2. The computer implemented method according to claim 1, wherein the validation is deemed successful when either the approved application process is determined to be the same as the particular component process, or the approved application process is different than the particular component process but the approved application process and the particular component process are otherwise approved for interoperation.

3. The computer implemented method according to claim 1, wherein the media processing component is selected from the group comprising: an encoder; a decoder; a multiplexer; and a demultiplexer.

4. The computer implemented method according to claim 1, wherein the media processing environment comprises an operating system of an electronic device.

5. The computer implemented method according to claim 1, wherein the media processing component is selected from the group comprising: a server-side processor; and a client-side processor.

6. The computer implemented method according to claim 1, wherein either the reference to the application or the reference to the globally unique identifier or both are selected from the group comprising: an address; a vector; a pointer; a URL; and a variable.

7. The computer implemented method according to claim 1, wherein the set of computer-executable instructions comprises an interface.

8. The computer implemented method according to claim 1, wherein the step of executing comprises, based on in-the-clear communication between the media processing component and the particular software application, repeatedly executing the set of computer-executable instructions to transform the particular input media content to produce the particular output media content for use by the particular software application.

9. A media processing environment, comprising:
a computer-readable storage medium; and
a processor responsive to the computer-readable storage medium and to a computer program, the computer program, when loaded into the processor, configured to perform a method for authorizing use of a media processing component in connection with a software application associated with the media processing environment, the method comprising:
transmitting a request to the media processing component, the request requesting transformation of particular input media content to produce particular output media content,
identifying a process within the media processing environment in which the software application is running,
identifying a globally unique identifier that the software application used to invoke the media processing component,
receiving a first authentication message from the media processing component, the authentication message including a nonce and/or certificate, and
based on the received first authentication message, transmitting a cryptographically secure second authentication message to the media processing component, the second authentication message including the received nonce and/or certificate, and also authentication data comprising either (i) the identified process or (ii) the identified globally unique identifier or (iii) both,
when the authentication data is validated by the media processing component by the media processing component making one or more API calls to verify the authentication data,
the media processing component authorized to transform the particular input media content to produce the particular output media content.

10. The media processing environment according to claim 9, wherein when the media processing component is authorized to transform, the method further comprising: using in-the-clear communication, repeatedly requesting execution of the set of computer-executable instructions to transform input media content to produce output media content for use by the particular software application.

11. The media processing environment according to claim 9, wherein the media processing environment comprises a consumer electronic device.

12. The media processing environment according to claim 11, wherein the consumer electronic device is selected from the group comprising: a personal computer; a phone; a media player device; a personal digital assistant; a set-top box device; a digital recording device; and an in-vehicle device.

13. A computer-readable storage medium encoded with computer-executable instructions which, when executed by a processor associated with an electronic device having an operating system configured to run a number of processes, implement a method for authorizing use of a processing component within the electronic device in connection with a software application within the electronic device, the method comprising:
arranging for the software application to transmit a request to the processing component, the request requesting the processing component to perform a particular function or service or both for the software application;
receiving an authentication message at the software application, the authentication message including a nonce and/or certificate;
based on the authentication message, arranging for the software application to transmit a cryptographically secure message to the processing component, the message including authentication data comprising the received nonce and/or certificate, and also a reference to an application process, of the number of processes, in which the software application is running;
identifying a component process of the number of processes, the processing component running in the component process;
ascertaining whether the application process is the same as the component process, by making one or more API calls to verify the application process is the same as the component process; and
when the application process is ascertained to be the same as the component process, the processing component authorized to perform the particular function or service or both for the software application.

14. The computer-readable storage medium according to claim 13, wherein the processing component is selected from the group comprising: an encoder; a decoder; a multiplexer; and a demultiplexer.

15. The computer-readable storage medium according to claim 13, wherein the processor is selected from the group comprising: a server-side processor; and a client-side processor.

16. The computer-readable storage medium according to claim 13, wherein the software application comprises a media player application.

17. The computer-readable storage medium according to claim 13, wherein the reference to the application process is selected from the group comprising: an address; a vector; a pointer; and a variable.

\* \* \* \* \*